United States Patent [19]
Willacy

[11] Patent Number: 5,468,073
[45] Date of Patent: Nov. 21, 1995

[54] BEARING ARRANGEMENT

[75] Inventor: Stephen J. Willacy, West Yorkshire, England

[73] Assignee: Lucas Industries Public Limited Company, England

[21] Appl. No.: 302,613

[22] Filed: Sep. 7, 1994

[30] Foreign Application Priority Data

Sep. 11, 1993 [GB] United Kingdom ............... 9319041

[51] Int. Cl.⁶ .................................................. F16C 33/76
[52] U.S. Cl. .................................................. 384/477
[58] Field of Search ........................ 384/477, 130, 384/476, 489, 543, 584

[56] References Cited

U.S. PATENT DOCUMENTS 3,317,258   5/1967   Hermann .

FOREIGN PATENT DOCUMENTS

| 0185515 | 12/1985 | European Pat. Off. . |
| 144818 | 8/1984 | Japan . |
| 819111 | 8/1959 | United Kingdom . |
| 1537227 | 12/1978 | United Kingdom . |
| 2267066 | 11/1993 | United Kingdom . |

*Primary Examiner*—Lenard A. Footland
*Attorney, Agent, or Firm*—Andrus, Sceales, Starke & Sawall

[57] ABSTRACT

A bearing arrangement is provided for supporting a movable member for directing a fluid flow from a first direction. A bearing sleeve encloses a bearing and a shield shields the bearing from the fluid flow.

8 Claims, 3 Drawing Sheets

BEARING ARRANGEMENT

The present invention relates to a bearing arrangement. Such an arrangement is suitable for supporting pivoted flow directors, such as vanes or aerofoils, within a fluid moving with respect to the flow director.

Known supports for movable flow directors, such as a vane in a flow of gas, hold an extension of the vane between bearings located within a recess formed in a supporting wall at one end of the vane. Gas can flow along the side wall so seals are provided so as to prevent the gas from leaking into the bearings. The seals may be a combination of a face seal, an "O" ring seal and a labyrinth seal. The provision of the seals takes up space that could be used to provide further bearings so as to provide a stronger support.

According to the present invention there is provided a bearing arrangement for a movable member for directing a fluid flow from a first direction, comprising a bearing sleeve enclosing a bearing, the bearing sleeve being attached to and movable with the movable member, and a shield for shielding the bearing from the fluid flow.

It is thus possible to site the bearing in a region shielded from the fluid flow by the shield. Such shielding significantly reduces the fluid pressure acting around the bearing sleeve, thereby reducing seepage of the fluid into the bearings.

Preferably the movable member is supported by a cantilever connected to the bearing sleeve.

Preferably the bearing sleeve is a cylindrical member supported on and co-axial with a support pin. Preferably ball or roller bearings are provided intermediate the bearing sleeve and the support pin so as to facilitate rotational movement between the sleeve and the support.

As the region in which the bearing sleeve is situated may be at a higher temperature than that of the support pin, warming of the bearing arrangement results in a self-freeing effect such that the bearing arrangement is resistant to seizing at elevated temperatures.

The provision of a shield directs the flow of fluid away from the bearing arrangement. Additionally it is believed that the resultant fluid flow around the shield creates a low pressure region down-stream of the bearing sleeve which tends to remove fluid from the region of the bearing. The fluid may, for example, be an exhaust gas which is particularly erosive.

Thus the need for seals is removed and the space freed by the removal of the seals may be used to provide a longer bearing surface, thereby giving rise to a firmer and stronger support and significant increase in bending moment capability.

The present invention will further be described, by way of example, with reference to the accompanying drawings, in which.

Figure 1:
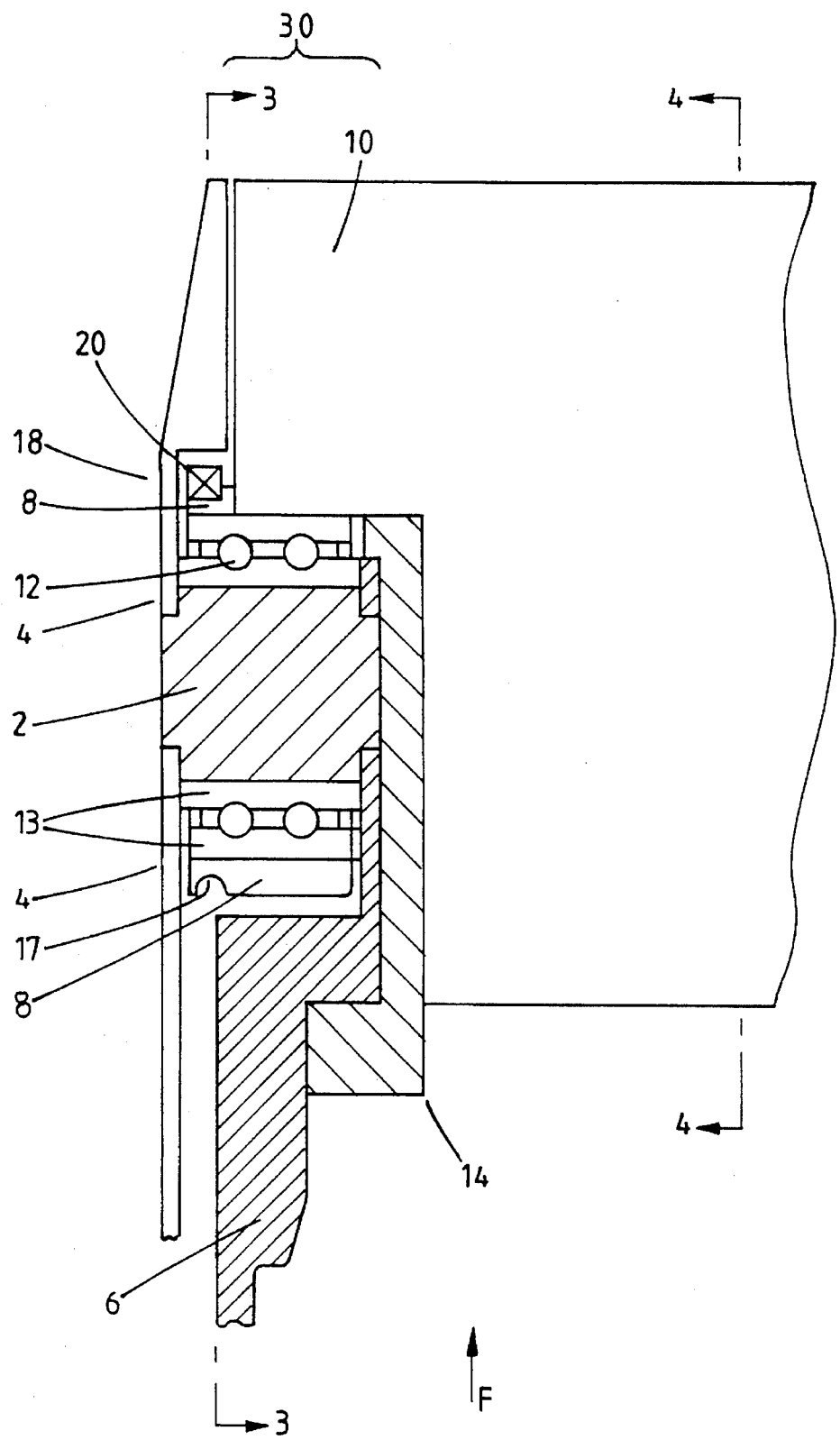
FIG. 1 is a cross sectional view of a bearing arrangement for a gas flow directing vane, constituting an embodiment of the present invention.

As shown in the accompanying Figures, a support pin 2 extends between, and is supported by, a cover 4 and a support 6. A bearing sleeve 8, formed at a first end of and attached to a flow directing vane 10, is held coaxially with the support pin 2 by ball bearings 12 held between bearing races 13. The bearings 12 are provided as a double bearing arrangement and are preloaded so as to provide a bearing that is highly resistant to forces acting to tilt the longitudinal axis on one of the races 13 away from the longitudinal axis of the other race 13 (i.e. resistant to forces acting perpendicular to the axis of the support pin 2).

A heat shield 14 reaches into a gap 15 between the support 6 and the vane 10 so as to reduce heat transfer from a fluid surrounding the vane to the bearings 12. The heat shield 14 shields the bearing sleeve 8 from the fluid flowing in the direction indicated by arrow F.

The bearing sleeve 8 carries a peripheral groove 17 which has a notch 18 formed therein. The notch 18 engages with an enlarged region 20 of a drive belt 22. Motion of the drive belt due to a motor (not shown) causes the bearing sleeve 8 to be rotated about the axis of the support pin 2 and thereby causes rotation of the vane 10 about the axis of the support pin 2. Thus the vane can be rotated to direct the direction of fluid flow.

Figure 2:
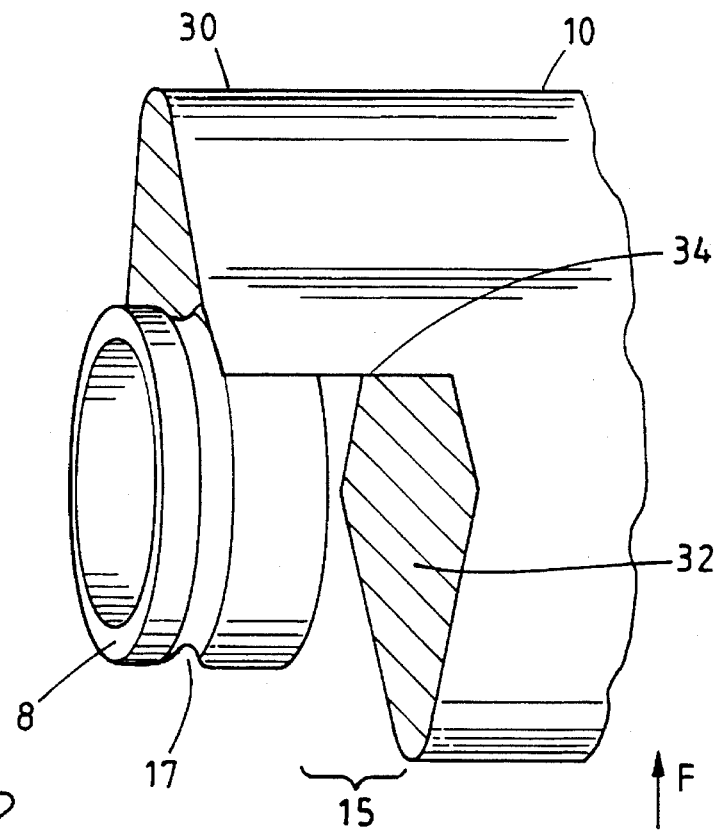
FIG. 2 is a perspective view of part of the bearing sleeve and the movable member of the embodiment shown in FIG. 1.
Figure 3:
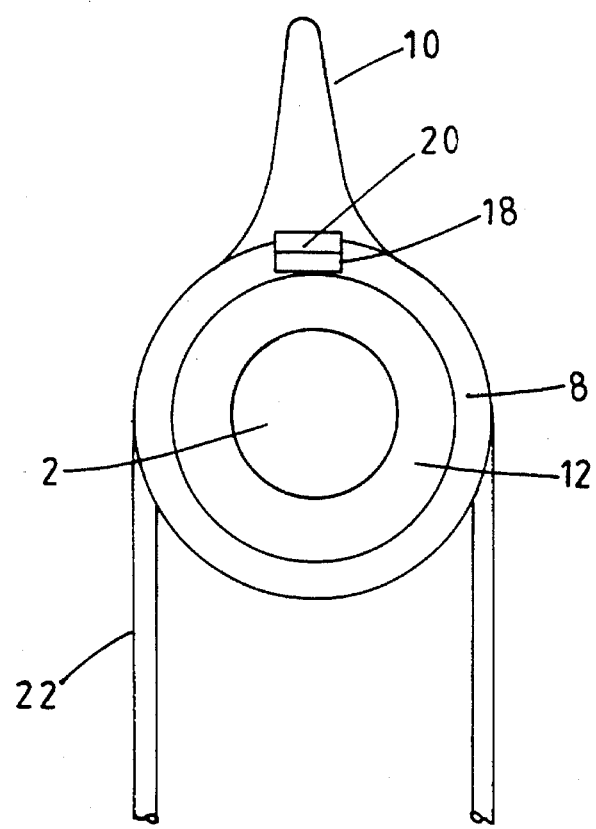
FIG. 3 is a cross sectional view along the line A—A of FIG. 1 with the cover 4 removed and looking along the vane 10.
Figure 4:
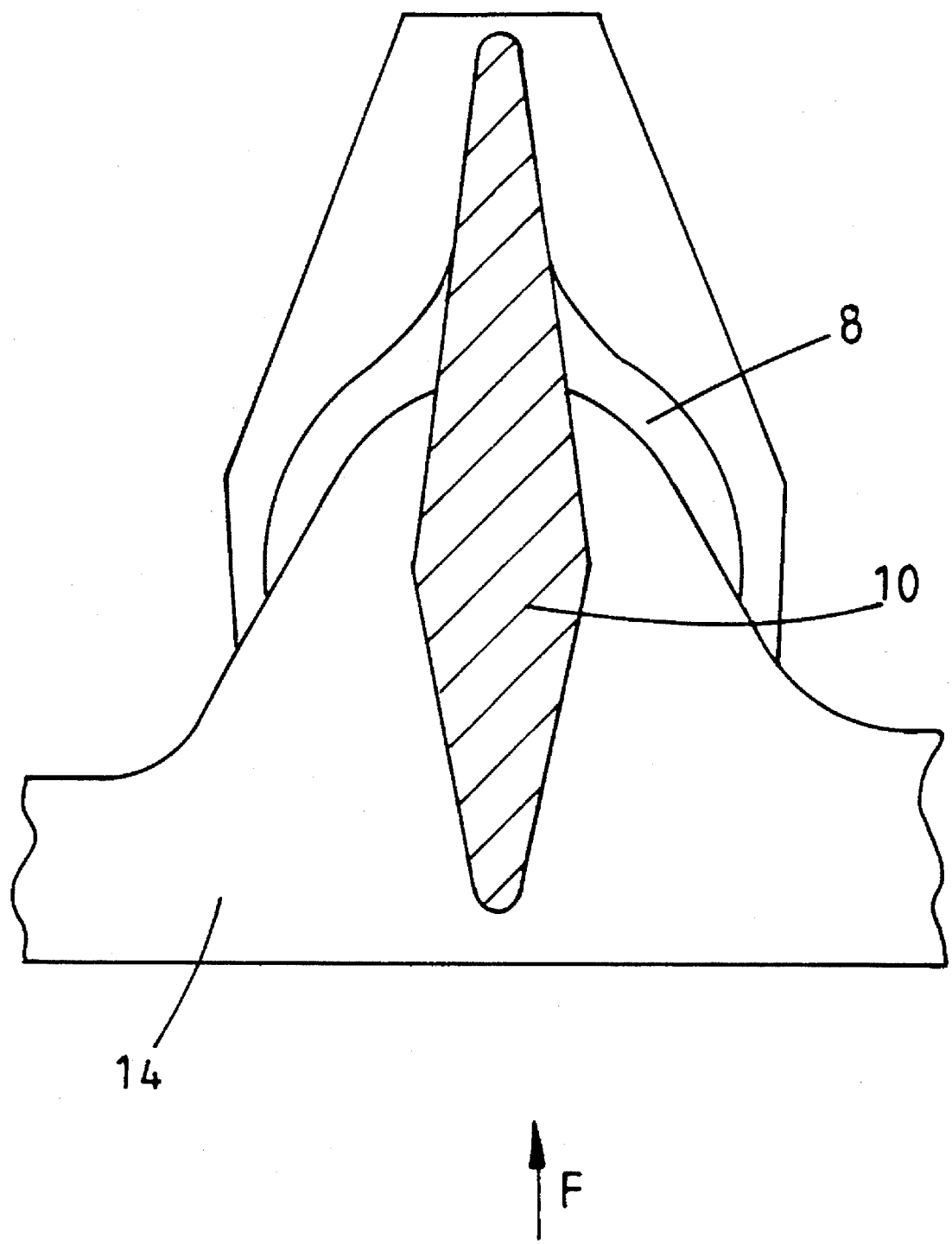
FIG. 4 is a cross sectional view along the line B—B of FIG. 1.

As shown in FIG. 2, the bearing sleeve 8 extends from a first end of the vane 10. The sleeve is connected to the vane 10 by way of a cantilevered portion 30 of the vane 10. The cantilevered portion 30 is profiled such that any fluid which flows around the edges of the shield 14 and towards the bearing housing is urged to approximate a laminar flow in the direction of arrow F. A front edge 34 of the cantilevered portion 30 in the vicinity of the heat shield 14 is in close proximity with the surface of the heat shield, so as to substantially prevent fluid flow to the up-stream side of the cantilevered portion 30 via the interface between the heat shield and the cantilevered portion 30. The bulk flow of the fluid carries the fluid past the edge 34, such that substantially no fluid enters the bearings 12.

The bearing arrangement is designed such that the warming of the bearing sleeve 8 causes the sleeve 8 to expand and to increase the size of the gap, in which the bearings 12 are located between the bearing sleeve 8 and the support pin 2. Thus heating of the bearing sleeve causes the bearing to become slightly looser, so as to protect the bearing against seizing.

It is thus possible to direct a flow of hot gas, with the vane, for instance so as to control a direction of the thrust. The elimination of the need to seal the bearing against the influx of gas allows a shorter and/or more robust bearing arrangement to be provided in a compact volume.

I claim:

1. A bearing arrangement for a movable member for directing a fluid flow from a first direction, said bearing arrangement comprising a bearing sleeve, a bearing, and a shield for shielding said bearing from the fluid flow, said bearing sleeve enclosing said bearing and being attached to and movable with the movable member.

2. A bearing arrangement as claimed in claim 1, further comprising a support pin, said bearing sleeve being a cylindrical member and being supported on and coaxial with said support pin.

3. A bearing arrangement as claimed in claim 2, in which said bearing comprises ball bearings provided intermediate said bearing sleeve and said support pin.

4. A bearing arrangement as claimed in claim 2, in which said bearing comprises roller bearings provided intermediate said bearing sleeve and said support pin.

5. A bearing as claimed in claim 2, in which said bearing sleeve and said support pin define a gap therebetween, the bearings being situated within the gap, and in which warming of said bearing sleeve with respect to said support pin increases the size of the gap.

6. A bearing as claimed in claim 1, in which said bearing sleeve carries a peripheral groove for engaging with a drive belt to move the movable member.

7. A bearing as claimed in claim 1, in which the movable member is supported by a cantilever connected to said bearing sleeve.

8. A bearing arrangement as claimed in claim 1, in which said shield alters the fluid flow such that, in use, a low pressure region is formed downstream of said bearing sleeve which tends to remove fluid from said bearing.

* * * * *